(12) United States Patent
Thomas et al.

(10) Patent No.: US 10,651,949 B1
(45) Date of Patent: May 12, 2020

(54) CALIBRATION FOR AN OPTICAL COMMUNICATIONS LINK

(71) Applicant: Hewlett Packard Enterprise Development LP, Houston, TX (US)

(72) Inventors: David Ritter Thomas, Ft. Collins, CO (US); William Lee, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/194,591

(22) Filed: Nov. 19, 2018

(51) Int. Cl.
*H04B 10/06* (2006.01)
*H04B 10/69* (2013.01)

(52) U.S. Cl.
CPC ................................. *H04B 10/691* (2013.01)

(58) Field of Classification Search
CPC .. H04B 10/60; H04B 10/691; H04B 10/6911; H04B 10/6931; H04B 10/695; H04B 10/697; H04B 10/40; H04B 10/0795; H04B 10/07953; H04B 10/69; H04B 10/66; H04L 7/0037; H04L 7/0337
USPC ....... 398/202, 208, 209, 210, 212, 213, 214, 398/33, 38, 25, 26, 27, 158, 159, 17, 22, 398/24, 135, 136; 250/214 A, 214 LA, 250/214 AG; 330/59, 308; 375/355, 316, 375/229
See application file for complete search history.

(56) References Cited

U.S. PATENT DOCUMENTS

| 7,302,365 | B2 | 11/2007 | Forey et al. | |
|---|---|---|---|---|
| 8,923,463 | B1 | 12/2014 | Jenkins et al. | |
| 9,800,438 | B1 | 10/2017 | Zhang et al. | |
| 2010/0150561 | A1* | 6/2010 | Cho | H04B 10/695 398/79 |
| 2010/0316394 | A1* | 12/2010 | Koiwai | H04B 10/6911 398/208 |

OTHER PUBLICATIONS

Ni.com; "an Introduction to Ni High-speed Serial Instruments"; Mar. 7, 2017; 10 pages.
Perrella, S.; "Development of Fpga-based High-speed Serial Links for High Energy Physics Experiments"; Feb. 15, 2018; 15 pages.

* cited by examiner

*Primary Examiner* — Hanh Phan
(74) *Attorney, Agent, or Firm* — Hewlett Packard Enterprise Patent Department (57) ABSTRACT

Examples described herein relate to calibration of an optical communications link. Data signals received over the optical communications link are measured to obtain an eye scan. A height of an upper eye region and a height of a lower eye region are compared in the eye scan. A common mode calibration value is adjusted based on any difference in the heights. A common mode adjustment circuit is then controlled based on the common mode calibration value. The common mode adjustment circuit is configured to remove a direct current bias within a receiver for the optical communications link.

20 Claims, 6 Drawing Sheets

CALIBRATION FOR AN OPTICAL COMMUNICATIONS LINK

BACKGROUND

In computer systems, data may be communicated across an optical communications link. The link may form part of a physical layer and be implemented by physical layer electronics. The physical layer defines how bits are to be transmitted and received over an optical transmission medium such as an optical fiber. For optical communications, optical transmitters may be configured to convert electrical impulses into optical signals, which may then be received by optical receivers and converted back into electrical impulses to enable data sampling. Optical communications links may be used within computing devices, e.g. to implement a systems bus, and/or to network different computing devices. As optical communications links allow high-speed communications, a serializer/deserializer (SERDES) may be used to group multiple data streams.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein provide an optical receiver and a method of calibrating an optical receiver. The optical receiver may form part of an optical transceiver. The optical receiver may form part of an optical communications link. For example, the optical receiver be used within an optical switch or a high-speed optical SERDES. Certain examples provide a way to calibrate a common mode component of an optical signal. For example, the common mode component may comprise a direct current component as output by a photodetector such as a photodiode. Calibration may comprise removing this direct current component. In examples, calibration is performed based on a common mode calibration value. The common mode calibration value is determined by processing an output of an eye scan. In one example, heights of upper and lower eye regions are compared, and the result of the comparison is used to selectively increment or decrement the common mode calibration value. The common mode calibration value may be used to modify the action of a common mode adjustment circuit to remove the direct current component. For example, the common mode adjustment circuit may comprise a variable resistor or current source whose operating value may be set using the common mode calibration value.

Figure 1:
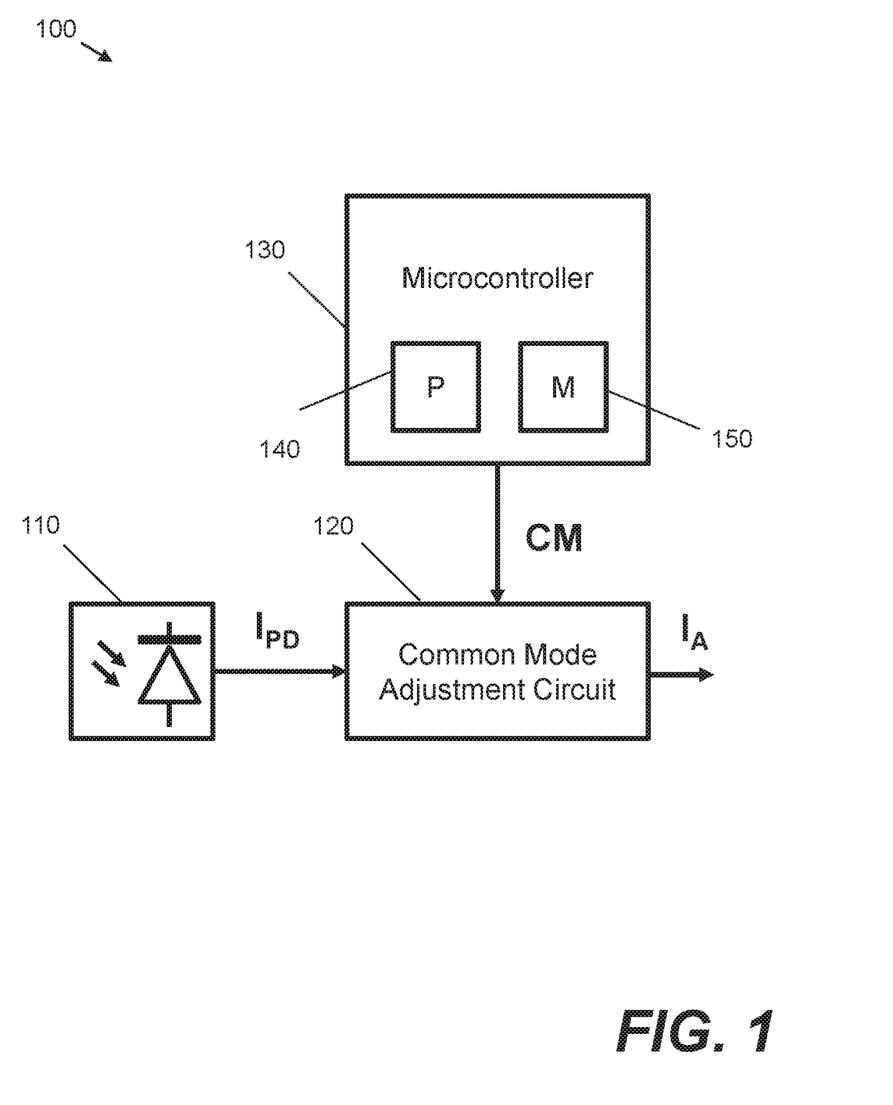
FIG. 1 is a schematic diagram of an optical receiver according to an example.

FIG. 1 shows an optical receiver 100 according to an example. It should be noted that FIG. 1 is a schematic diagram where certain features have been omitted to better explain the operation of the optical receiver. The optical receiver 100 comprises a photodetector 110. This may comprise one or more photodiodes. The photodetector 110 detects light that is transmitted over an optical communications link, such as a fiber optic cable. The light carries a data signal. The photodetector 110 converts the light received over the optical communications link into an electrical signal. In FIG. 1, this is a current signal, $I_{PD}$.

The optical receiver 100 of FIG. 1 further comprises a common mode adjustment circuit 120 and a microcontroller 130. The common mode adjustment circuit 120 comprises one or more electronic components that are configured to receive the current signal $I_{PD}$ from the photodetector 110 and to process this signal to output an adjusted current signal, $I_A$. The common mode adjustment circuit 120 is configured to remove a direct current bias (i.e. a common mode component) from the current signal $I_{PD}$. The common mode adjustment circuit 120 is controlled based on a common mode calibration value, CM, that is received from the microcontroller 130.

The microcontroller 130 of FIG. 1 comprises at least one processor 140 and a memory 150. The microcontroller 130 may implement a link training engine (LTE) for the optical receiver 100. The microcontroller may comprise an Application Specific Integrated Circuit (ASIC), system-on-chip (SOC), a Field Programmable Gate Array (FPGA) or the like. The microcontroller 130 is configured to load instructions from the memory 150 for execution by the processor 140. The memory 150 may comprise volatile and non-volatile memory components. The instructions may comprise firmware instructions.

The microcontroller 130, through the execution of the instructions by the processor 130, is configured to perform a number of operations to set a value for the common mode calibration value, CM. During one of a test mode or a data transmission mode, data signals are transmitted over the optical communications link such that light is received at the photodetector 110. The microcontroller 130 is configured to obtain bit error measurements from an eye scan performed on data signals received by the optical receiver 100. In one case, the eye scan may be performed by the microcontroller 130. For example, the microcontroller 130 may be configured to receive the adjusted current signal, $I_A$, or a voltage or current signal that results from processing the adjusted current signal, $I_A$. The memory 150 of the microcontroller 130 may comprise instructions to perform an eye scan. In other cases, an eye scan may be performed by one or more logic components that are communicatively coupled to the microcontroller 130. For example, an eye scan circuit may comprise a suitably configured FPGA, an ASIC, another microcontroller having a processor and memory, or other electronic circuitry that receives the adjusted current signal $I_A$. These one or more logic components may form part of the optical receiver 100. The eye scan comprises a series of bit error measurements that may be used to generate at least a portion of an eye diagram.

The microcontroller 130 is further configured to use the bit error measurements from the eye scan to determine a height of an upper eye region and a height of a lower eye region. An eye region may comprise a region of sample positions where the bit error measurements are below a predefined threshold. An upper eye region may comprise a set of adjustments to the sample position that move the sample position in a first direction and a lower eye region may comprise a set of adjustments to the sample position that move the sample position in a second direction, the second direction being opposite to the first direction. In one case, the upper eye region relates to voltage offsets applied in a positive direction and the lower eye region relates to voltage offsets applied in a negative direction. The upper and lower eye regions may be determined for a particular sample unit interval, e.g. for a particular time within a range of times for one sample. In one case, the upper and lower eye regions are determined for a unit interval that is determined to be an optimal sample position in time, e.g. a center of an eye diagram for received data.

Once the upper and lower eye regions have been determined by the microcontroller 130, they are compared. If there is a difference in height between the regions, e.g. if the heights of the two regions differ by a predefined threshold, then this difference may be used to calibrate the direct current bias that is removed by the common mode adjustment circuit 120. For example, the difference may be used to set and/or modify the common mode calibration value, CM. In one case, the common mode calibration value, CM, may be incremented or decremented, i.e. increased or decreased by a predefined amount, based on a sign of the difference. For example, if the upper eye region is greater than the lower eye region, the common mode calibration value CM may be incremented, e.g. increased by a predefined value such as 1. If the lower eye region is greater than the upper eye region, the common mode calibration value CM may be decremented, e.g. decreased by a predefined value such as 1. The modification of the common mode calibration value CM thus controls the action of the common mode adjustment circuit 120 and modifies a direct current bias that is removed from the current signal $I_{PD}$. For example, if the upper eye region is greater than the lower eye region, incrementing the common mode calibration value may increase the current component that is removed from the current signal $I_{PD}$, in turn raising a center point of a sample position; similarly, if the lower eye region is greater than the upper eye region, decrementing the common mode calibration value may reduce the current component that is removed from the current signal $I_{PD}$, in turn lowering a center point of a sample position.

Figure 2A:
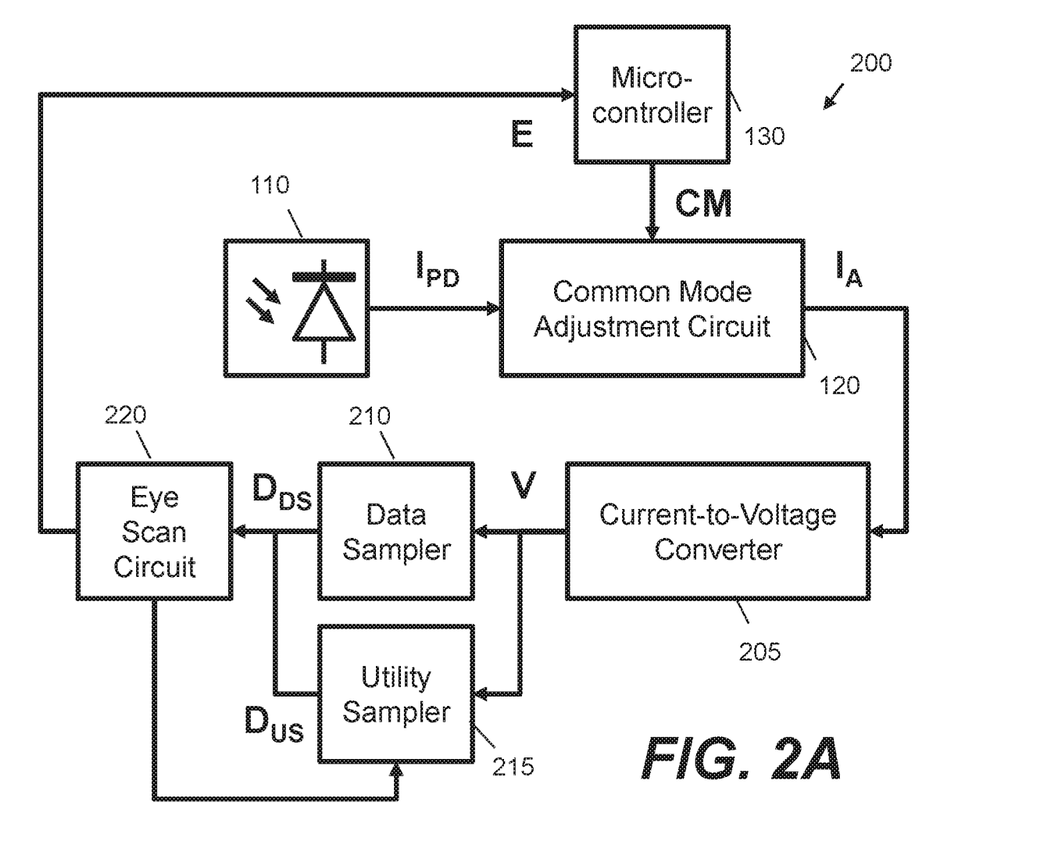
FIGS. 2A and 2B are schematic diagrams of additional components of an optical receiver according to examples.

FIG. 2A shows an example of an optical receiver 200 showing additional components that may be used to process the adjusted current signal $I_A$. FIG. 2A shows the photodetector 110 and the common mode adjustment circuit 120 from FIG. 1. In FIG. 2A, the optical receiver 200 further comprises a current-to-voltage converter 205. In this example, the common mode adjustment circuit 120 is electrically coupled between the photodetector 110 and the current-to-voltage converter 205. The current-to-voltage converter 205 may comprise an amplifier such as a transimpedance amplifier. The current-to-voltage converter 205 converts the adjusted current signal $I_A$ to a voltage signal V. The voltage signal V is output by the current-to-voltage converter 205 and received by a data sampler 210. The data sampler 210 is arranged to apply decision logic to the received voltage signal V to output a data stream $D_{DS}$. For example, the data sampler 210 may compare the received voltage signal V with a configurable voltage threshold at a configurable sample time (e.g. at a sample position). The sample time may be set based on a clock signal. The data stream, $D_{DS}$, from the data sampler is a stream of bits that represents the data received over the optical communications link. The data stream $D_{DS}$ may be output by the optical receiver 200 as a received bit sequence.

In the example of FIG. 2A, a utility sampler 215 is also provided in parallel with the data sampler 210. The utility sampler 215 may also receive the voltage signal V from the current-to-voltage converter 205. The utility sampler 215 is configured to output a second data stream, $D_{US}$. The utility sampler 215 is controllable so as to use a different sample position from the data sampler 210. For example, the utility sampler 215 may use a common sample time but apply a positive or negative voltage offset. In FIG. 2A, an eye scan circuit 220 is coupled to both the data sampler 210 and the utility sampler 215 and receives the respective data streams $D_{DS}$ and $D_{US}$. The eye scan circuit 220 compares the data obtained using the data sampler 210 and the data obtained using the utility sampler 215. The eye scan circuit 220 is communicatively coupled to the microcontroller 130. The eye scan circuit 220 performs an eye scan and outputs bit error measurements, E, that may be used by the microcontroller 130 as described with reference to FIG. 1. For example, the bit error measurements may result from a comparison of an output of the data sampler 210 and an output of the utility sampler 215.

In the example of FIG. 2A, the sample position for the utility sampler is variable. In this example, an eye scan as performed by the eye scan circuit 220 comprises applying a positive or negative voltage offset to the sample position of the utility sampler 215. This control is shown by the arrow from the eye scan circuit 220 to the utility sampler 215. After a particular voltage offset is applied by the utility sampler 215, the eye scan circuit 220 compares the data stream $D_{US}$ obtained using the utility sampler 215 to the data stream $D_{DS}$ obtained using the data sampler 210. The sample position used by the data sampler 210 may be fixed as an initially-calibrated data sample position. The data may be in the form of binary values, e.g. each value is 0 or 1. The bit error measurements may indicate the number of times in a predefined period that the data differs between the two samples, i.e. a form of bit error rate. The eye scan circuit 220 may compare the data streams by applying an XOR operation. An error rate may be determined by dividing by a number of data samples in a data sequence.

During a data transmission mode, the data that is being transmitted over the optical communications link may not be known before it is received. Using a data sampler 210 and a utility sampler 215 and detecting differences between sampled data enables the eye scan to be performed during the data transmission mode. In other cases, the eye scan may be performed in a test mode. In this case, the data transmitted over the optical communications link may be a predefined data sequence and so a single sampler may be used, where a bit error measurement is determined by comparing samples of the received data with the known data sequence. In this case, the bit error measurement may be a bit error rate for the transmitted data. In this case, there may be one sampler (e.g. a single data sampler 210) to which a voltage offset may be applied. In both cases, samples obtained from the data sampler 210 may form a data sequence that is taken as the data received over the optical communications link.

In certain cases, the common mode adjustment circuit 120 comprises a digital-to-analogue converter (DAC). In this case, the common mode calibration value comprises a digital variable (e.g. an integer within an input range for the DAC). For example, the current signal $I_{PD}$ from the photodetector 110 may be input as a positive or upper reference signal to the DAC, where a negative or lower reference signal input for the DAC is coupled to ground. An output for the DAC may then provide the adjusted signal $I_A$, where a digital control value supplied to the DAC is used to adjust the output by changing a resistance applied within the DAC. In this case, the common mode calibration value CM may comprise the digital control value supplied to the DAC. For example, if the DAC takes an 8-bit value as a control input, then the common mode calibration value may be a value between 0 and 255. The size of the increment and/or decrement may be set as a configurable parameter of the optical receiver 100. In one case, the size of the increment and decrement may be one DAC integer step (e.g. +1 or −1).

Figure 2B:
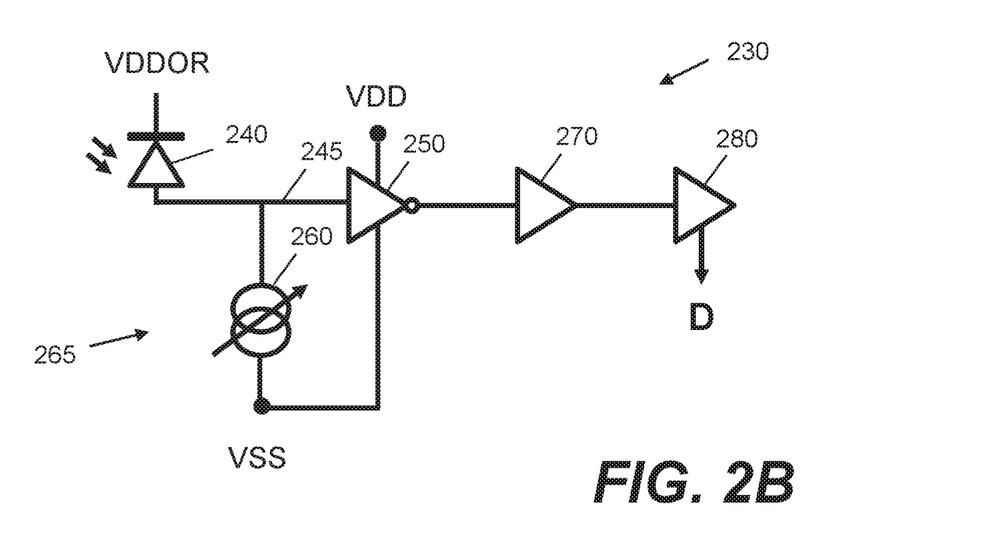

FIG. 2B shows an example 230 of certain components that may be used as part of an optical receiver, e.g., optical receiver 100 or 200. FIG. 2B is a schematic diagram and so certain couplings, components and connections are omitted to help explain a general function of the example. In FIG. 2B, a photodiode 240 is electrically coupled between a voltage source—VDDOR—(e.g. relating to a drain supply of the optical receiver) and an input 245 of a transimpedance amplifier 250. The transimpedance amplifier 250 is also electrically coupled to an upper power supply or "rail"—VDD—(e.g. a drain supply for the amplifier) and a lower power supply or "rail"—VSS—(e.g. a source supply for the amplifier). A variable current source 260 is then electrically coupled between the input 245 and the lower power supply VSS. The variable current source 260 forms part of a common mode adjustment circuit 265. A similar circuit may implement the common mode adjustment circuit 120. The variable current source 260 may be controlled using a common mode calibration value. In one case, the variable current source 260 may be implemented using a digital-to-analogue converter. The variable current source 260 may be controlled based on a digital value, such as an 8-bit value. The common mode adjustment circuit 265 may be configured such that adjusting the variable current source 260 changes a current component that is removed from the input 245 (e.g. increases or decreases a given negative bias). For example, the variable current source 265 may act as a negative source. The transimpedance amplifier 250 converts a current received at its input 245 to an equivalent voltage. The transimpedance amplifier 250 may be configured to operate with a zero-centered current input. In this case, the variable current source 265 may be adjusted to zero-center the current input. There may be one or more non-zero current components that are removed using the variable current source 265. In one case, both a '1' symbol and a '0' symbol may be transmitted at a given light level, e.g. where a light level for a '1' is greater than a light level for a '0'. In certain cases, an optical transmitter may provide a non-zero level of light for all transmitted symbols. In these cases, the variable current source 265 may be configured to remove a first current component that is a mean current level for the transmitted symbols (e.g. a mean of the current levels for both a '1' and a '0' symbol) and a second current component that represents channel and/or receiver effects. The output from the transimpedance amplifier passes through a gain stage 270 before a data sampling stage 280. The gain stage 270 may be seen to model a gain introduced by at least one or more of the current-to-voltage converter 205 and data sampler 210. In certain cases, the gain stage 270 may amplify a voltage signal output by the transimpedance amplifier 250 to allow data sampling at the data sampling stage 280. The gain stage 270 may be modelled as a non-linear gain. The common mode adjustment circuit 265 thus enables a direct current adjustment despite there being a non-linear relationship between the current at input 245 and the voltage signal received by the data sampling stage 280. If a utility sampler is used, it may receive a signal from the gain stage 270 in parallel with the data sampling stage 280.

Figure 3A:
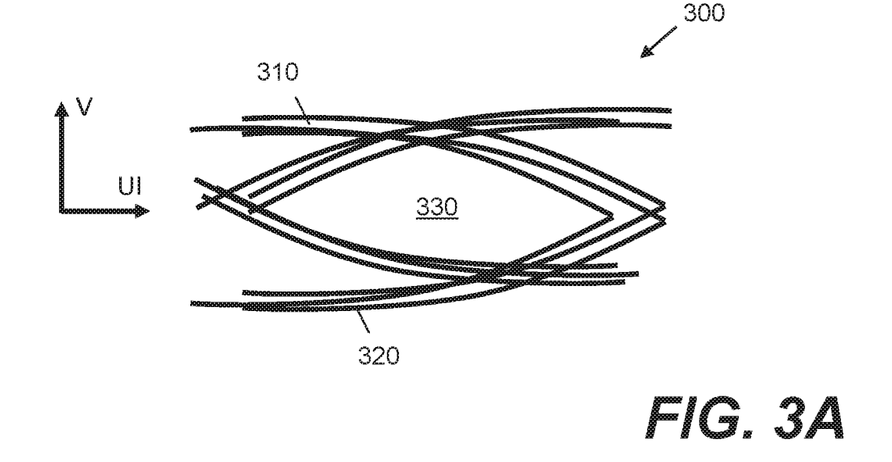
FIGS. 3A and 3B are schematic diagrams showing eye diagrams according to an example.

FIG. 3A shows an example of an eye diagram 300. This eye diagram is presented to help describe the eye scan operation. An eye diagram (sometimes referred to as an eye pattern) is generated when a plurality of data signals, e.g. as received over a communications medium, are superimposed. The data signals may be binary data signals having two voltage levels. Due to channel effects, such as noise, attenuation, inference or distortion, the received data signal differs from the transmitted data signal. For example, a non-return-to-zero signal may encode a binary signal using rectangular pulse-amplitude modulation, where a binary 1 is transmitted at a positive voltage +V and a binary 0 is transmitted at a negative voltage −V. In the eye diagram, the "rails" 310 and 320 respectively represent how these binary signals are received, e.g. a result of repetitively sampling a received signal comprising a random sequence of 1s and 0s. As may be seen, the originally rectangular wave forms are "smeared" by the channel effects to become more saw-tooth-like. The region between the rails 310 and 320 is referred to as an "eye". In FIG. 3A, the vertical direction represents a voltage axis and the horizontal direction represents a time axis, where time may be measured in unit intervals (UI) of a sample period.

Figure 3B:
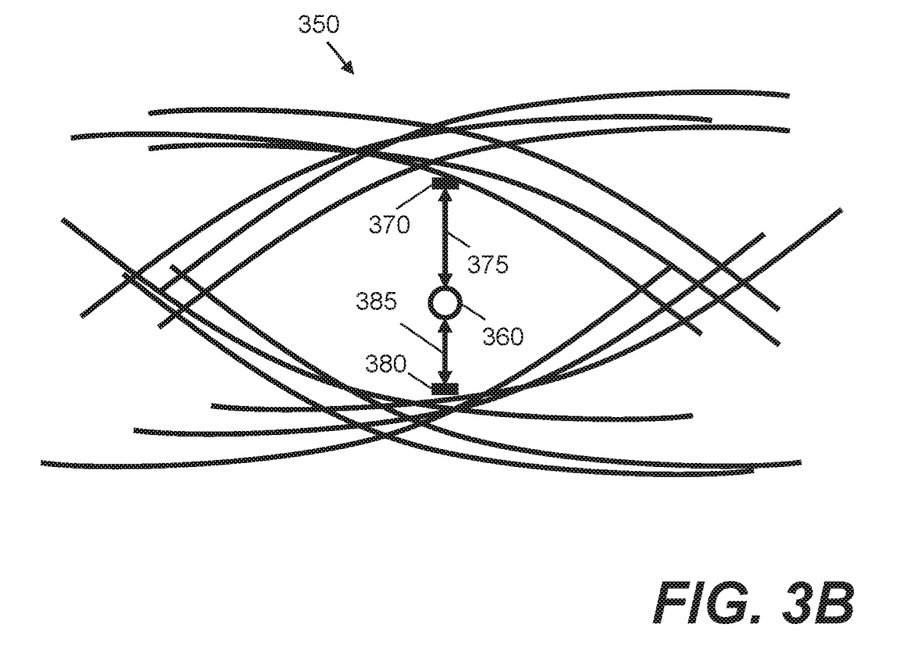

FIG. 3B shows a second eye diagram 350 where upper and lower eye regions are shown. It should be noted that when performing an eye scan as described herein no eye diagram may be generated or viewed, instead data may be obtained in the form of arrays of values that represent cross-sections of the eye diagram for a particular time or unit interval. In FIG. 3B, sample position 360 represents a default sample position, e.g. a default sample position of a data sampler. This may represent a voltage offset of 0. The eye diagram may be generated by shifting a sample position, e.g. of a utility sampler, in the time and voltage directions, e.g. shifting the time within the sample period and shifting a voltage offset in both positive and negative directions. Point 370 represents a top of the eye, and a distance between the sample position 360 and point 370 may represent an upper eye region 375. Point 380 represents a bottom of the eye, and a distance between the sample position 360 and point 380 may represent a lower eye region 385. When performing an eye scan as opposed to constructing an eye diagram there may not be any shift with regard to the horizontal time axis.

Figure 4:
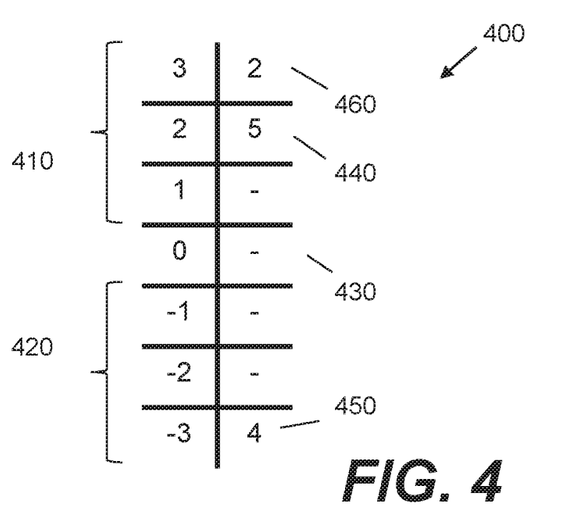
FIG. 4 is a schematic diagram showing an output of an eye scan according to an example.

FIG. 4 shows an example 400 of bit error measurements that may result from an eye scan. The left-hand column of values represents a series of voltage offsets that are applied during the eye scan. These may comprise voltage offsets that are applied to a utility sampler. There is a first set of positive voltage offsets 410 and a second set of negative voltage offsets 420. The zero-point 430 may comprise a default sampling position, e.g. a sampling position for a data sampler. The right-hand column of values represents bit error measurements obtained at each voltage offset. In this case, the bit error measurement comprises a value for a negative exponent for detected bit errors between two data streams (e.g. $1 \times 10^{-x}$), such as data from a data sampler and data from a utility sampler or a known data sequence and data from the data sampler. Bit error measurements above and/or below a given threshold may be clipped, e.g. in FIG. 4 a dash "-" indicates that the bit error measurement is below a lower bound (similarly, a bit error measurement may also be clipped above an upper bound). In this example, an upper eye region may be defined as a subrange of the positive voltage offsets 410 where the bit error measurement is below a predefined threshold and a lower eye region may be defined as a subrange of the negative voltage offsets 420 where the bit error measurement is also below the predefined threshold. In FIG. 4, if the predefined threshold is set as $1 \times 10^{-6}$, then measurements 440, 450 and 460 are above this threshold ($1 \times 10^{-5}$, $1 \times 10^{-4}$ and $1 \times 10^{-2}$ respectively), and a height of the upper eye region is 1 (e.g. voltage offset 1 has a bit error measurement below the predefined threshold) and a height of the lower eye region is 2 (e.g. voltage offsets −1 and −2 have a bit error measurement below the predefined threshold). In this case, voltage offsets with bit error measurements above the predefined threshold, such as 440 to 460 are not counted as part of the eye-height subranges. With reference to FIG. 1, this would result in the common mode adjustment value being reduced, as the height of the lower eye region is greater than the height of the upper eye region. It should be noted that the methods to determine a height of an eye region may vary according to the configuration of the optical receiver.

Figure 5:
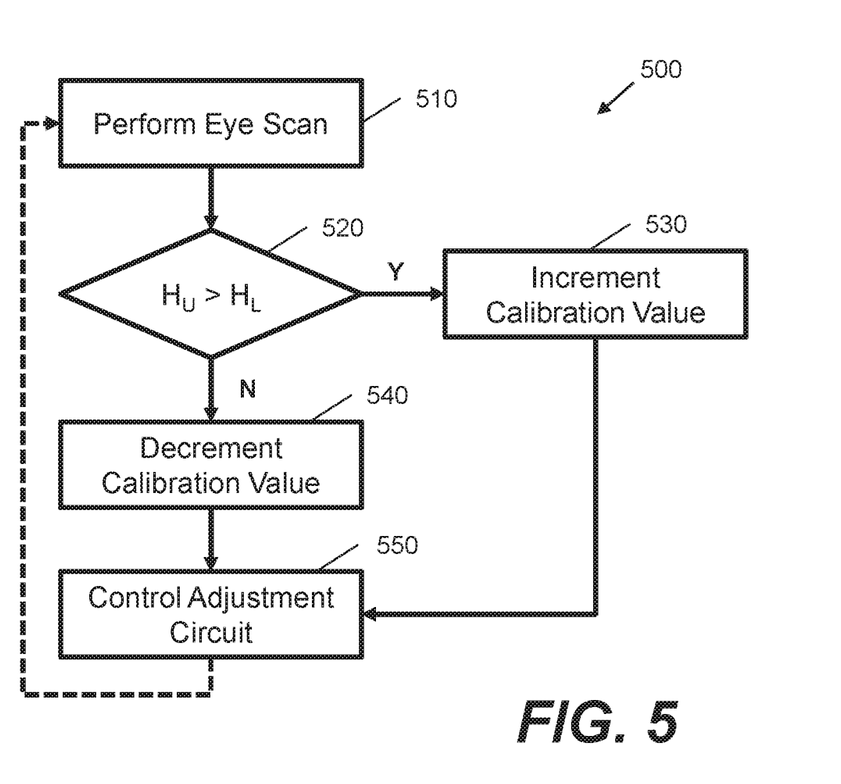
FIG. 5 is a flow diagram showing a method of calibrating a receiver for an optical communications link according to an example.

FIG. 5 shows a method 500 of calibrating a receiver for an optical communications link according to an example. The method 500 may be implemented in association with the optical receiver 100 of FIG. 1, or another receiver, e.g., optical receiver 200. At block 510, an eye scan is performed. The eye scan measures data signals received over the optical communications link as described herein. In one case, the eye scan is configured to generate data similar to that shown in FIG. 4. At block 520, a comparison is made between a height of an upper eye region, $H_U$, and a height of a lower eye region, $H_L$. In FIG. 5, the comparison determines if the height of the upper eye region, $H_U$, is greater than the height of the lower eye region, $H_L$. Responsive to the height of the upper eye region being greater than the height of the lower eye region, the method proceeds to block 530 where a common mode calibration value is incremented. Responsive to the height of the upper eye region being less than the height of the lower eye region (i.e. the height of the lower eye region being greater than the height of the upper eye region), the method proceeds to block 540 where the common mode calibration value is decremented. Following either of blocks 530 and 540, the method proceeds to block 550, where a common mode adjustment circuit as described herein is controlled based on the common mode calibration value. The common mode adjustment circuit is configured to remove a direct current bias from an output of a photodetector of the receiver. The common mode adjustment circuit may comprise a circuit such as the common mode adjustment circuit 120 shown in FIGS. 1 and 2.

As shown by the dotted line in FIG. 5, blocks 510 to 550 of the method 500 may be repeated to iteratively adjust the direct current bias that is removed by the common mode adjustment circuit. For example, the common mode calibration value may be initialized, and then the value iteratively modified by repeating blocks 510 to 550. In examples, the eye scan measures data signals that are received over the optical communications link, and the common mode adjustment circuit modifies the initial electrical signal as received from the photodetector before the eye scan makes bit error measurements upon the data signal. As such, the adjustment at block 550 changes the bit error measurements that are made when block 510 is repeated. The method 500 may be repeated until a difference between the two eye region heights is below a predefined threshold. This provides a practical method for adjusting a common mode of a photodetector signal despite there being non-linearities present in a signal processing pipeline prior to data sampling.

Figure 6:
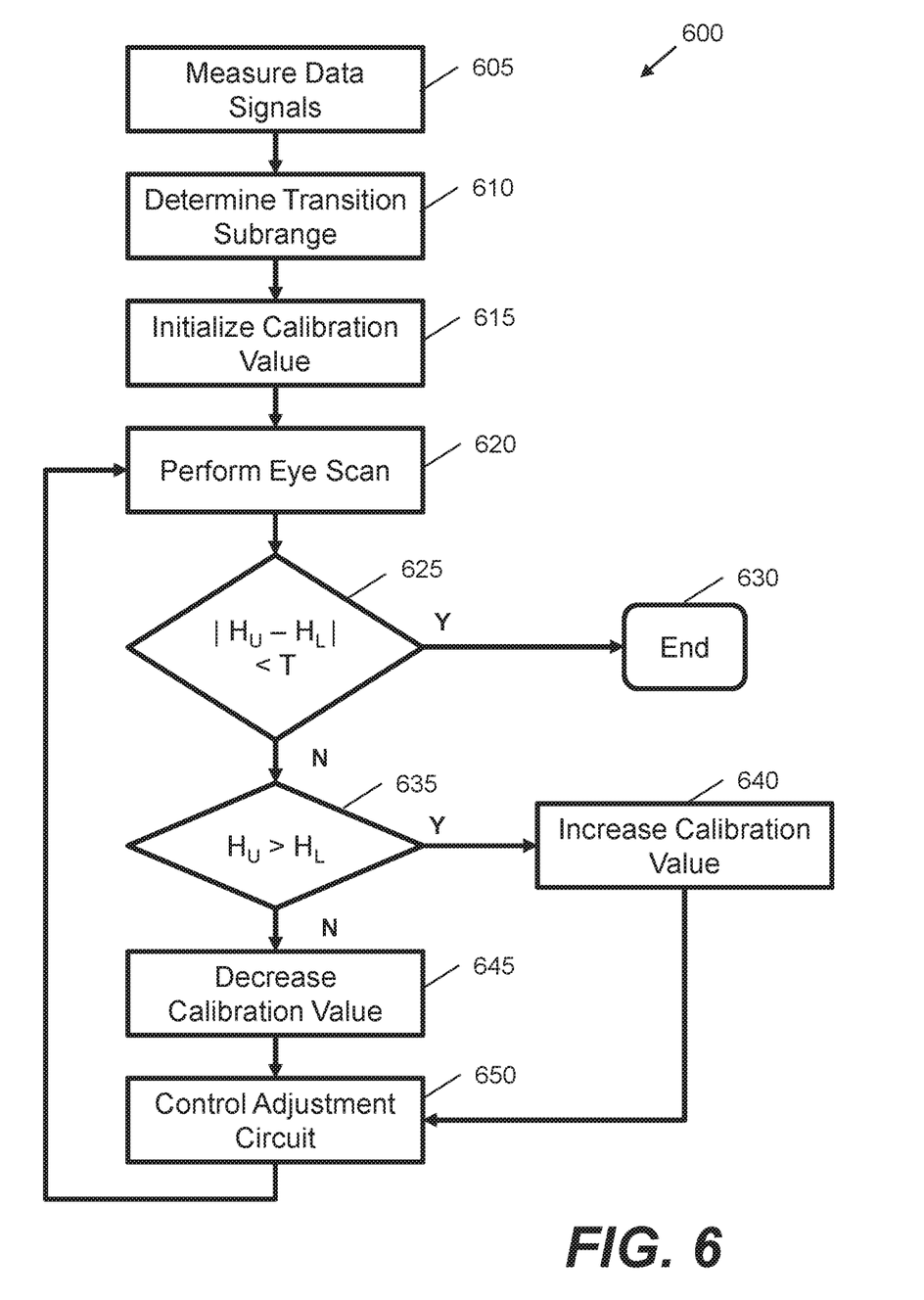
FIG. 6 is a flow diagram showing a method of calibrating a receiver for an optical communications link according to another example.

FIG. 6 is another example of a method 600 of calibrating a receiver, e.g., receiver 100 or 200, for an optical communications link. The method 600 comprises additional blocks to initialize the common mode calibration value and to check for a stop condition.

At block 605, a first set of measurements are made. These measurements may be made at a different data rate to a data rate used in subsequent blocks or at the same data rate. At block 605, a range of common mode initialization values are determined. These may be considered as an initial set of possible common mode calibration values, e.g. a coarse-grained set that are used to determine how to initialize the common mode calibration value used in the method 500 of FIG. 5. These values may comprise a division of a range of digital values available to control a common mode adjustment circuit. Data signals are transmitted and measurements of the received data are made for each of the common mode calibration values in the range. The data signals may comprise a random or pseudo-random sequence of bits such that there are transition changes between data symbols within the data signals. These measurements may be made during a test mode or link configuration stage where the data may be destructively sampled.

At block 610, a subrange of common mode initialization values is determined at which a signal transition is observed. For example, for each common mode initialization value, it may be determined whether a signal transition occurs. A signal transition indicates that it is possible to discriminate different data symbols within the data signals (e.g. values of 0 and 1 are detected). If no signal transition is detected, this indicates that it is not possible to discriminate different data symbols (e.g. the data is seen as all 0 or all 1). The subrange may comprise a range of common mode initialization values that represent a "passing region". At block 615, a common mode calibration value is initialized based on the subrange determined at block 610. Block 615 may comprise initializing the common mode calibration value as a mid-point of the determined subrange, e.g. an average of upper and lower passing values. This then sets a good "coarse-grained" initial value for the common mode calibration value, where a more precise adjustment may be determined using operations similar to those shown in FIG. 5. This "coarse-grained" initialization may be performed periodically, e.g. as part of a link training procedure.

Turning back to FIG. 6, blocks 620 to 650 comprise a variation of blocks 510 to 550 of the method 500 of FIG. 5. At block 620, a second set of measurements are made. These measurements may be made at a normal data rate for transmission, for example, 2.5 Ghz to 28 Ghz for a non-return-to-zero (NRZ) encoding or 28 Ghz to 56 Ghz for a 4-level pulse-amplitude modulation (PAM-4). At block 620, an eye scan is performed in a similar manner to block 510 of FIG. 5. At block 625, a magnitude of a difference between a height of an upper eye region ($H_U$) and a height of a lower eye region ($H_L$) is compared with a predefined threshold (T). If the difference is below the threshold then the method ends at block 630: the common mode calibration value may be deemed optimal. If the difference is above the threshold, then the common mode calibration value is adjusted using blocks 635 to 650.

Blocks 635 to 650 correspond to blocks 520 to 550 of the method 500 of FIG. 5. At block 635, a determination is made as to whether the height of an upper eye region ($H_U$) is greater than a height of a lower eye region ($H_L$). If it is, then the common mode calibration value is increased at block 640. If it is not, then the common mode calibration value is decreased at block 645. Blocks 640 and 645 may respectively increase and decrease the common mode calibration value by adding and subtracting a predefined amount (e.g. incrementing and decrementing the value). At block 650, the common mode calibration value is used to configure a common mode adjustment circuit, e.g. such as the common mode adjustment circuit 120 or 265. The method then loops back around to block 620. At the subsequent performance of block 620, the measurements are made with a different common mode adjustment circuit configuration. This may modify the subsequent eye region heights. The method is repeated to iteratively adjust the common mode calibration value until the test at block 625 passes.

In this example, blocks 605 to 615 may comprise an initial calibration sequence, which is then followed by an iterative fine-tuning sequence represented by blocks 620 to 650. The initial calibration sequence may be instructed by a processor such as the microcontroller 130 of FIG. 1. In one case, the initial calibration sequence may be performed by suitably designed control circuitry (e.g. a particular hardware configuration). In this case, the microcontroller 130 may activate and/or read data from a register and/or a signal line of this circuitry. In another case, the initial calibration sequence may form part of instructions stored in the memory 150 that are executed by the processor 140 of the microcontroller 130. As indicated elsewhere, a combination of approaches may also be used.

In a certain case, controlling the common mode adjustment circuit comprises supplying the common mode calibration value to a digital-to-analogue converter within the common mode adjustment circuit as described herein, wherein an output of the digital-to-analogue converter is used to remove the direct current bias. In this case, if, for example, the digital-to-analogue converter received an 8-bit input control value, the range of common mode initialization values may be increments of 16 between 0 and 255.

In one case, the height of the upper eye region ($H_U$) is determined at block 620 by determining a plurality of positive voltage offsets that have an associated bit error measurement below a predefined threshold, e.g. where the bit error measurements are low or acceptable. Likewise, the height of the lower eye region ($H_L$) may be determined at block 620 by determining a plurality of negative voltage offsets that have an associated bit error measurement below a predefined threshold. The bit error measurement may be a bit error rate. The bit error measurement may be made by comparing an output of a data sampler and a utility sampler, e.g. where the voltage offsets are applied by the utility sampler.

The method 500 and/or at least blocks 620 to 650 may be iteratively performed while the optical communications link is being used for data transmission, i.e. while the link is "up". In this way small adjustments may be made to a direct current bias that is removed from a current output of a photodetector. This enables the optical receiver to adapt to changes in the configuration of the optical communications link, e.g. dynamically adapt to changes in environmental conditions and/or changes in the operation of the receiver circuitry.

Figure 7:
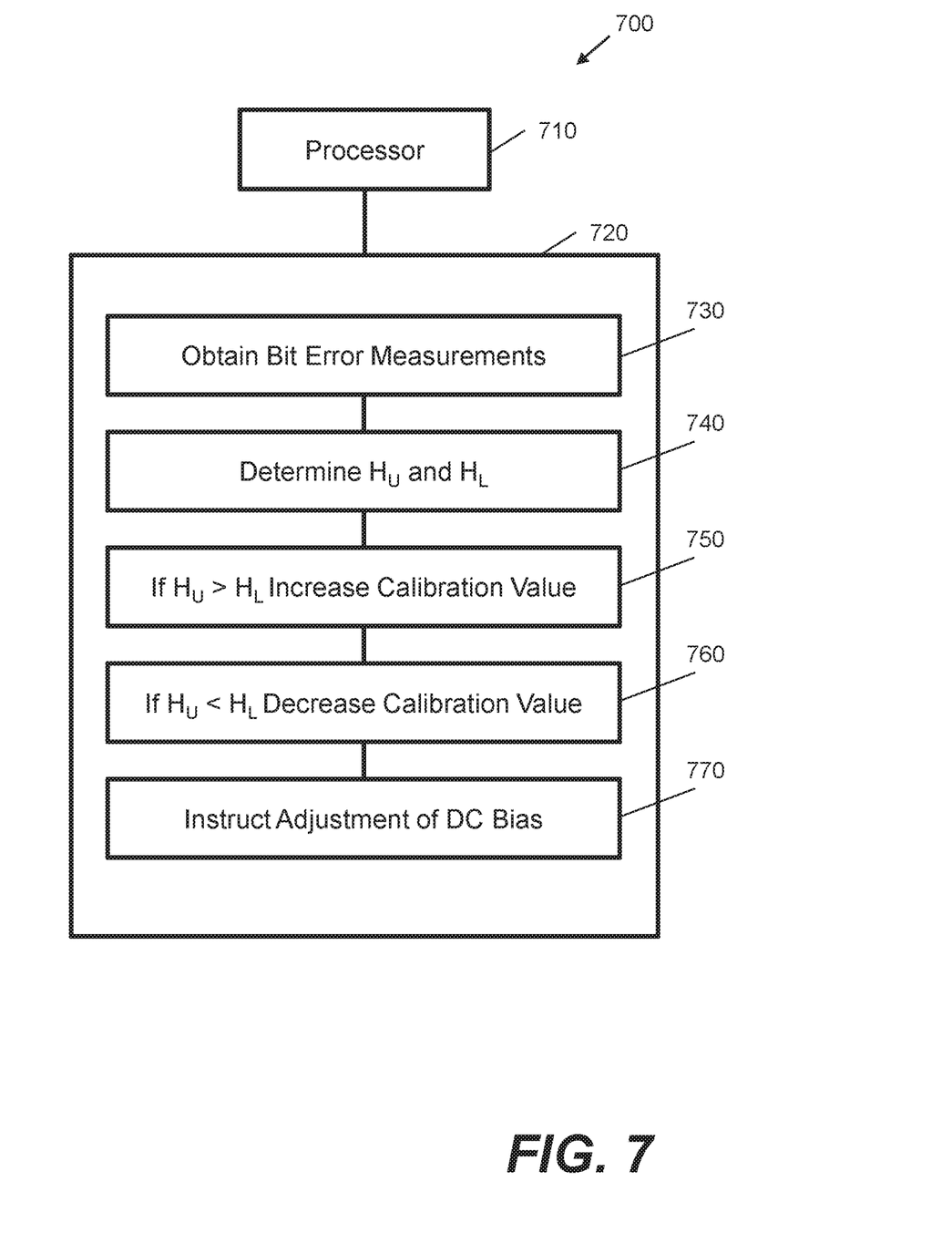
FIG. 7 is a schematic diagram showing a non-transitory computer-readable storage medium according to an example.

FIG. 7 shows a processing system 700 comprising at least one processor 710 and a non-transitory computer-readable storage medium 720 comprising a set of computer readable instructions stored thereon which, when executed by the at least one processor 710, cause said processor to perform a method of optical communications link calibration. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In one case, the computer readable instructions may comprise firmware that is stored within a non-volatile memory of a microcontroller. The processor 710 may comprise the processor 140 of FIG. 1 and the non-transitory computer-readable storage medium 720 may comprise the memory 150 of FIG. 1.

Via instructions 730, the processor 710 is instructed to obtain bit error measurements from an eye scan performed on data received over an optical communications link. These bit error measurements may comprise comparisons between a received data sequence and a predefined data sequence and/or a "miscompare" count between the output of a data sampler and an adjustable utility sampler. The eye scan may comprise varying a voltage offset for the utility sampler, e.g. an offset that is applied within logic to determine whether a 0 or a 1 is received. Alternatively, the bit error measurements may be obtained by adjusting a sample position of a data sampler and comparing an output data stream with a known data sequence. Via instructions 740, a height of an upper eye region and a height of a lower eye region are determined from the bit error measurements. This may comprise operations similar to those described with reference to FIG. 4. As with other examples described herein, the upper and lower eye heights may be determined by increasing or decreasing a voltage offset of a utility sampler until a bit error measurement exceeds a predefined threshold.

Via instructions 750 and 760, a number of comparisons are made. Via instructions 750, responsive to the height of the upper eye region being greater than the height of the lower eye region, a common mode calibration value is increased, e.g. by incrementing the common mode calibration value. Via instructions 760, responsive to the height of the lower eye region being greater than the height of the upper eye region, the common mode calibration value is decreased, e.g. by decrementing the common mode calibration value. Via instruction 770, an adjustment of a direct current bias is instructed. The direct current bias is removed from an output of a photodetector of a receiver for the optical communications link based on the common mode calibration value. Examples of how this may be performed are described with reference to FIGS. 1, 2A and 2B.

In certain cases, the instructions are to be iteratively executed by the processor until a difference between the height of the upper eye region and the height of the lower eye region is below a predefined threshold.

In certain cases, the instructions may cause the processor 710 to instruct an initial calibration for the common mode calibration value. This may comprise activating control circuitry to detect signal transitions and output an initial common mode calibration value based on a subrange of common mode values at which signal transitions are observed. The control circuitry may comprise analogue and/or digital control circuitry. In one case, the instructions may comprise initialization instructions to be executed prior to the instructions to obtain bit error measurements. The initialization instructions when executed by the processor, may cause the processor to perform the initial calibration, e.g. in place of or together with additional hardware components. The initial calibration may comprise measuring data signals transmitted over the optical communications link. Measurements may be made for a plurality of common mode initialization values. From these measurements, a subrange of common mode initialization values at which a signal transition is observed may be determined and the common mode calibration value initialized as a mid-point of the determined subrange.

Certain examples described herein calibrate an optical communications link by adjusting a direct current bias that is removed from a photodetector output. An optical receiver that implements this calibration provides an improvement over comparative approaches. Certain examples allow for calibration despite asymmetries in an eye shape. For example, certain examples described herein operate despite asymmetry issues such as unequal rise and/or fall times, a lack of centering of the eye, and/or overshoot. These issues may prevent accurate calibration in comparative approaches. The examples described herein allow the optical receiver to be tuned and improve an accuracy of data sampling, e.g. by preventing a photodiode direct-current common-mode component from interfering with signal processing and sampling. Certain examples provide improvements as compared to comparative analogue approaches to remove this component and/or hardware state machines. The common-mode component may be variably removed to center the eye and improve data sampling. This is achievable despite possible non-linearities in the current signal processing pipeline. Certain examples described herein may be applied periodically while an optical communications link is being used to communicate data to maintain correct calibration. The examples may reduce engineer configuration and test time to tune the optical communications link and may also reduce maintenance time by dynamically adapting to changes. Certain examples described herein are suitable for use with high-amplitude pseudorandom binary sequence waveforms, whereas these waveforms may not be suitable when using comparative low-pass filtering techniques. The examples may operate despite the common mode current component being dependent on a magnitude of a transmitted signal. Certain examples described herein may be implemented as part of electrical-to-optical transceivers and/or optical switches. Certain examples may be implemented as part of link training, where link training is a process by which the transmitter and receiver on a high-speed serial link communicate with each other in order to tune their equalization settings.

Although the disclosure herein has been described with reference to particular examples, it is to be understood that these examples are merely illustrative of the principles of the disclosure. For example, reference is made to removing a direct current bias. This bias may be a positive or negative bias depending on a configuration of an optical receiver. Hence, removal of a direct current bias may comprise adding a current component of an opposite polarity and/or removing a current component of a common polarity. Furthermore, while particular processes are shown in a specific order in the appended drawings, such processes are not limited to any particular order unless such order is expressly set forth herein: rather, processes may be performed in a different order or concurrently and blocks may be added or omitted. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method of calibrating a receiver for an optical communications link comprising:
    performing an eye scan by measuring data signals received over the optical communications link;
    comparing a height of an upper eye region and a height of a lower eye region;
    responsive to the height of the upper eye region being greater than the height of the lower eye region, incrementing a common mode calibration value;
    responsive to the height of the lower eye region being greater than the height of the upper eye region, decrementing the common mode calibration value; and
    controlling a common mode adjustment circuit based on the common mode calibration value, the common mode adjustment circuit being configured to remove a direct current bias from an output of a photodetector of the receiver.

2. The method of claim 1, wherein the method comprises, prior to performing the eye scan:
    for a plurality of common mode initialization values, measuring data signals transmitted over the optical communications link;
    determining a subrange of common mode initialization values at which a signal transition is observed; and
    initializing the common mode calibration value as a mid-point of the determined subrange.

3. The method of claim 1, wherein controlling the common mode adjustment circuit comprises:
    supplying the common mode calibration value to a digital-to-analogue converter within the common mode adjustment circuit, wherein an output of the digital-to-analogue converter is used to remove the direct current bias.

4. The method of claim 1, comprising:
    repeating the method until a difference between the height of the upper eye region and the height of the lower eye region is below a predefined threshold.

5. The method of claim 1, comprising:
    determining the height of the upper eye region by determining a plurality of positive voltage offsets that have an associated bit error measurement below a predefined threshold; and
    determining the height of the lower eye region by determining a plurality of negative voltage offsets that have an associated bit error measurement below a predefined threshold.

6. The method of claim 1, wherein the method is iteratively performed while the optical communications link is being used for data transmission.

7. An optical receiver comprising:
    a photodetector;
    a common mode adjustment circuit to remove a direct current bias from a current output of the photodetector; and
    a microcontroller comprising a processor and a memory, the memory comprising instructions that when executed by the processor cause the microcontroller to:
        obtain bit error measurements from an eye scan performed on data signals received by the optical receiver over an optical communications link;
        determine a height of an upper eye region and a height of a lower eye region from the bit error measurements;
        compare the height of the upper eye region and the height of the lower eye region; and calibrate the direct current bias that is removed by the common mode adjustment circuit based on a difference in the compared heights.

8. The optical receiver of claim 7, wherein the optical receiver comprises:
a current-to-voltage converter, wherein the common mode adjustment circuit is electrically coupled between the photodetector and the current-to-voltage converter, wherein an output of the current-to-voltage converter is used to recover a transmitted data signal.

9. The optical receiver of claim 8, comprising:
a data sampler, electrically coupled to the output of the current-to-voltage converter, to apply decision logic to a voltage signal received from the current-to-voltage converter to output a data stream representative of the transmitted data signal.

10. The optical receiver of claim 9, comprising:
an eye scan circuit communicatively coupled to the data sampler and the microcontroller to:
receive data samples from the data sampler;
perform the eye scan; and
provide the bit error measurements from the eye scan to the microcontroller.

11. The optical receiver of claim 10, comprising:
a utility sampler electrically coupled to the output of the current-to-voltage converter, the utility sampler being configured to sample the voltage signal received from the current-to-voltage converter at a configurable sample position,
wherein the eye scan circuit is configured to receive and compare data samples from the data sampler and the utility sampler to perform the eye scan.

12. The optical receiver of claim 7, wherein the common mode adjustment circuit comprises a digital-to-analogue converter and the memory of the microcontroller comprises instructions that when executed by the processor cause the microcontroller to:
increment a common mode calibration value responsive to the height of the upper eye region being greater than the height of the lower eye region; and
decrement a common mode calibration value responsive to the height of the upper eye region being less than the height of the lower eye region,
wherein the common mode calibration value is used to control an output of the digital-to-analogue converter.

13. The optical receiver of claim 12, comprising control circuitry to:
for a plurality of common mode initialization values, measure data signals transmitted over the optical communications link;
determine a subrange of common mode initialization values at which a signal transition is observed; and
initialize the common mode calibration value as a midpoint of the determined subrange.

14. The optical receiver of claim 7, wherein the microcontroller is configured to iteratively execute the instructions to center the eye scan.

15. The optical receiver of claim 7, wherein the common mode adjustment circuit comprises a variable current source that is controlled by the microcontroller to remove the direct current bias.

16. A non-transitory computer-readable storage medium storing instructions that, when executed by a processor, cause the processor to:
obtain bit error measurements from an eye scan performed on data received over an optical communications link;
determine a height of an upper eye region and a height of a lower eye region from the bit error measurements;
responsive to the height of the upper eye region being greater than the height of the lower eye region, increase a common mode calibration value;
responsive to the height of the lower eye region being greater than the height of the upper eye region, decrease the common mode calibration value; and
instruct an adjustment of a direct current bias that is removed from an output of a photodetector of a receiver for the optical communications link based on the common mode calibration value.

17. The medium of claim 16, wherein the bit error measurements are based on a difference between an output of a data sampler and an output of a utility sampler.

18. The medium of claim 16, wherein the instructions are to be iteratively executed by the processor until a difference between the height of the upper eye region and the height of the lower eye region is below a predefined threshold.

19. The medium of claim 16, wherein the instructions cause the processor to:
instruct an initial calibration of the common mode calibration value.

20. The medium of claim 16, wherein the instructions cause the processor to:
control a utility sampler to apply a range of voltage offsets; and
compare data values obtained from a data sampler and the utility sampler for each of the range of voltage offsets to obtain the bit error measurements.

* * * * *